(12) United States Patent
Takayanagi et al.

(10) Patent No.: US 10,408,669 B2
(45) Date of Patent: Sep. 10, 2019

(54) COMBINATION WEIGHING DEVICE

(71) Applicant: YAMATO SCALE CO., LTD., Akashi-shi, Hyogo (JP)

(72) Inventors: Kazuo Takayanagi, Akashi (JP); Kouhei Kikuchi, Akashi (JP)

(73) Assignee: YAMATO SCALE CO., LTD., Akashi-Shi, Hyogo (JP)

( * ) Notice: Subject to any disclaimer, the term of this patent is extended or adjusted under 35 U.S.C. 154(b) by 223 days.

(21) Appl. No.: 15/559,877

(22) PCT Filed: Mar. 31, 2015

(86) PCT No.: PCT/JP2015/060099
§ 371 (c)(1),
(2) Date: Sep. 20, 2017

(87) PCT Pub. No.: WO2016/157404
PCT Pub. Date: Oct. 6, 2016

(65) Prior Publication Data
US 2018/0058910 A1    Mar. 1, 2018

(51) Int. Cl.
| | | |
|---|---|---|
| *G01G 19/387* | (2006.01) | |
| *G01G 11/00* | (2006.01) | |
| *B65G 65/44* | (2006.01) | |
| *G01G 11/14* | (2006.01) | |
| *G01G 19/393* | (2006.01) | |

(52) U.S. Cl.
CPC ........... *G01G 19/387* (2013.01); *B65G 65/44* (2013.01); *G01G 11/003* (2013.01); *G01G 11/14* (2013.01); *G01G 19/393* (2013.01)

(58) Field of Classification Search
CPC .... G01G 11/003; G01G 11/14; G01G 19/387; G01G 19/393; B65G 47/1421; B65G 47/145; B65G 65/44
See application file for complete search history.

(56) References Cited

U.S. PATENT DOCUMENTS 4,529,049 A    7/1985  Fukuda
4,844,191 A    7/1989  Mikami et al.
(Continued)

FOREIGN PATENT DOCUMENTS

CN    1420342 A    5/2003
CN    102007388 A   4/2011
(Continued)

OTHER PUBLICATIONS

Japanese Office Action and English translation for Application No. 2017-508918, dated Jul. 3, 2018.
(Continued)

*Primary Examiner* — Randy W Gibson
(74) *Attorney, Agent, or Firm* — Birch, Stewart, Kolasch & Birch LLP (57) ABSTRACT

A combination balance includes: a dispersion table that radially disperses articles loaded from above; and a vibration unit that vibrates the dispersion table up and down, wherein the dispersion table has a table main body and a wall portion, the table main body has a discharge region from which the articles are discharged and a non-discharge region from which the articles are not discharged, and the vibration unit has a plurality of vibration portions horizontally facing each other.

6 Claims, 5 Drawing Sheets

(56) References Cited

U.S. PATENT DOCUMENTS

2003/0089529 A1    5/2003   Komatsu
2011/0036645 A1    2/2011   Kageyama et al.
2017/0305679 A1*  10/2017   Kageyama ............. B65G 65/40

FOREIGN PATENT DOCUMENTS

| | | |
|---|---|---|
| EP | 1312899 A2 | 5/2003 |
| JP | 2003-149036 A | 5/2003 |
| JP | 2007-145544 A | 6/2007 |
| JP | 2010-281748 A | 12/2010 |
| JP | 2013-193813 A | 9/2013 |
| JP | 2014-139552 A | 7/2014 |
| WO | 2009/128379 A1 | 10/2009 |

OTHER PUBLICATIONS

Russian Office Action and Search Report for Application No. 2017134808, dated Jul. 25, 2018, with an English translation.
Extended European Search Report for counterpart European Application No. 15887557.5, dated Oct. 16, 2018.
Mexican Office Action for counterpart Mexican Application No. MX/A/2015/0135772, dated Oct. 15, 2018, with English translation.
Chinese Office Action and Search Report, dated Feb. 19, 2019, for Chinese Application No. 201580078353.6, with English translations.
International Search Report for PCT/JP2015/060099 dated May 26, 2015.

* cited by examiner

COMBINATION WEIGHING DEVICE

TECHNICAL FIELD

The present invention relates to a combination balance.

BACKGROUND ART

Patent Document 1 listed below discloses an example of the combination balance. The combination weighing device described in Patent Document 1 includes a dispersion table that radially disperses articles loaded from above, and a vibration unit that vibrates the dispersion table in a circumferential direction.

CITATION LIST

Patent Literature

Patent Literature 1: Japanese Patent No. 5095477

SUMMARY OF INVENTION

Technical Problem

In the above-mentioned combination weighing device, articles on the dispersion table are moved in the circumferential direction (rotationally moved) to be radially dispersed, so that the articles are supplied to a plurality of supply hoppers arranged around the dispersion table.

In this sort of combination weighing device, there are cases in which the size of the dispersion table is increased in order to increase the number of supply hoppers.

However, when the driving force of the vibration unit that vibrates the dispersion table in the circumferential direction is increased in accordance with an increase in the size of the dispersion table, the load that acts on the vibration unit increases, which may cause problems such as malfunctioning or damage.

In order to solve the above-described problems, it is an object of the present invention to provide a combination balance in which the load that acts on the vibration unit can be suppressed even when the size of a dispersion table is increased.

Solution to Problem

The present invention is directed to a combination balance including: a dispersion table configured to radially disperse articles loaded from above; and a vibration unit configured to vibrate the dispersion table up and down, wherein the dispersion table has a table main body and a wall portion, the table main body has a discharge region from which the articles are discharged and a non-discharge region from which the articles are not discharged, and the vibration unit has a plurality of vibration portions horizontally facing each other.

With this configuration, the dispersion table is not vibrated in the circumferential direction, and thus the load that acts on the vibration unit can be suppressed even when the size of the dispersion table is increased.

Advantageous Effects of Invention

According to the present invention, it is possible to provide a combination balance in which the load that acts on the vibration unit can be suppressed even when the size of a dispersion table is increased.

DESCRIPTION OF EMBODIMENT

Hereinafter, an embodiment of the present invention will be described with reference to the drawings. In the drawings described below, the same or similar constituent elements are denoted by the same reference numerals.

Figure 1:
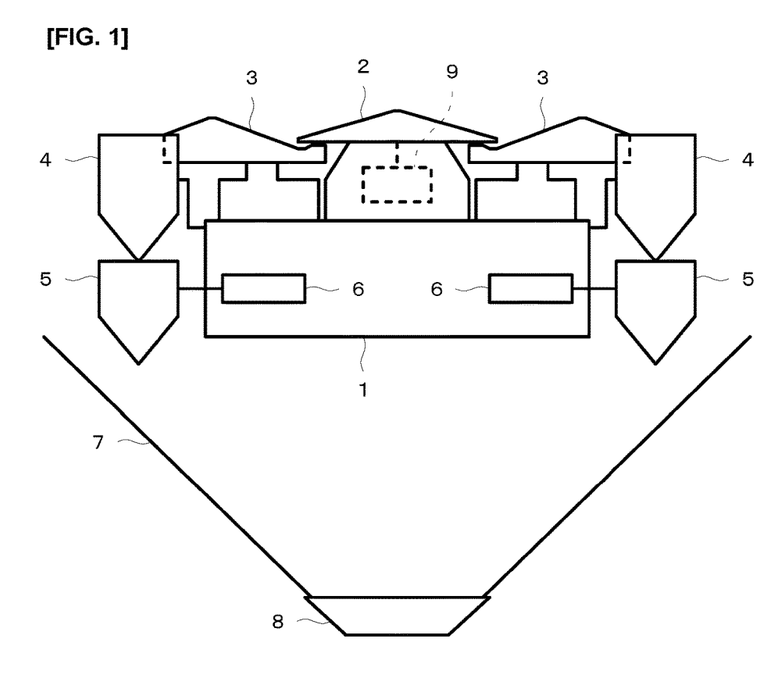
FIG. 1 is a schematic view showing the configuration of a combination balance according to an embodiment of the present invention.
Figure 2:
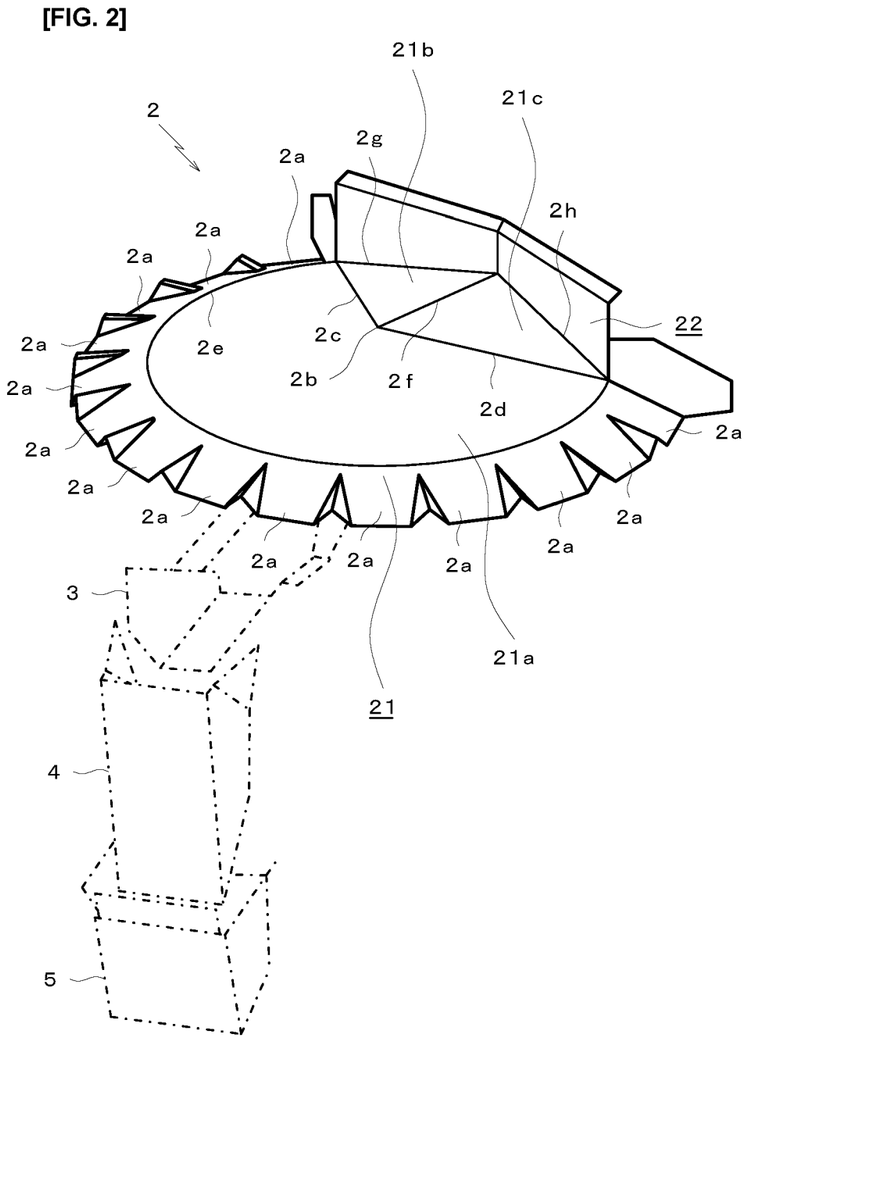
FIG. 2 is a perspective view of a dispersion table.

Referring to FIGS. 1 and 2, the schematic configuration of a combination balance 100 according to an embodiment of the present invention will be described. The combination balance 100 is a device, for example, for weighing articles such as snacks and discharging the articles in units of a predetermined weight.

As shown in FIG. 1, the combination balance 100 includes a center base 1, a dispersion table 2, linear feeders 3, supply hoppers 4, weighing hoppers 5, weight sensors 6, a collecting chute 7, a collecting funnel 8, a vibration unit 9, and the like. As is well known, the combination balance 100 also includes other various units (a controller, a power source, etc.), but these units will not be shown nor described because they are irrelevant to the present invention.

The center base 1 is arranged at the center in the width direction of the combination balance 100. The dispersion table 2 is arranged on the upper side of the center base 1. A plurality of guide portions 2a are formed along the circumferential edge of the dispersion table 2 (see FIG. 2).

The linear feeders 3 are respectively arranged at positions corresponding to the guide portions 2a of the dispersion table 2 (positions facing the guide portions 2a). The supply hoppers 4 are respectively arranged at positions corresponding to the linear feeders 3 (positions facing the linear feeders 3). The weighing hoppers 5 are respectively arranged at positions corresponding to the supply hoppers 4 (positions below the supply hoppers 4). The weight sensors 6 are respectively attached to the weighing hoppers 5. The linear feeders 3, the supply hoppers 4, and the weighing hoppers 5 are radially arranged along the circumference of the dispersion table 2.

The collecting chute 7 is arranged below the radially arranged weighing hoppers 5. The collecting funnel 8 is arranged below the collecting chute 7.

Referring to FIG. 1, an operation of the combination balance 100 will be described.

The dispersion table 2 sends articles, which have been supplied from an external supply device (not shown) to the center of the dispersion table 2, toward the circumferential edge thereof by means of vibrations.

The linear feeders 3 feed the articles sent from the guide portions 2a of the dispersion table 2, into the respective supply hoppers 4 by means of vibrations. The supply hoppers 4 receive the articles fed from the respective linear feeders 3. When a weighing hopper 5 arranged below any supply hopper 4 becomes empty, a discharge gate (not shown) provided at the supply hopper 4 is opened, so that articles are loaded into the weighing hopper 5.

The weighing hoppers 5 receive the articles loaded from the respective supply hoppers 4. The weight sensors 6 measure the weight of articles in the respective weighing hoppers 5, and output the measured values to the controller (not shown).

When weighing hoppers 5 are selected by the controller (not shown) as a discharge combination of a predetermined weight, discharge gates (not shown) provided at the weighing hoppers 5 are opened, so that articles are loaded into the collecting chute 7. The articles loaded into the collecting chute 7 slide down the collecting chute 7, and are discharged via the collecting funnel 8 to a packaging machine or the like.

Figure 3:
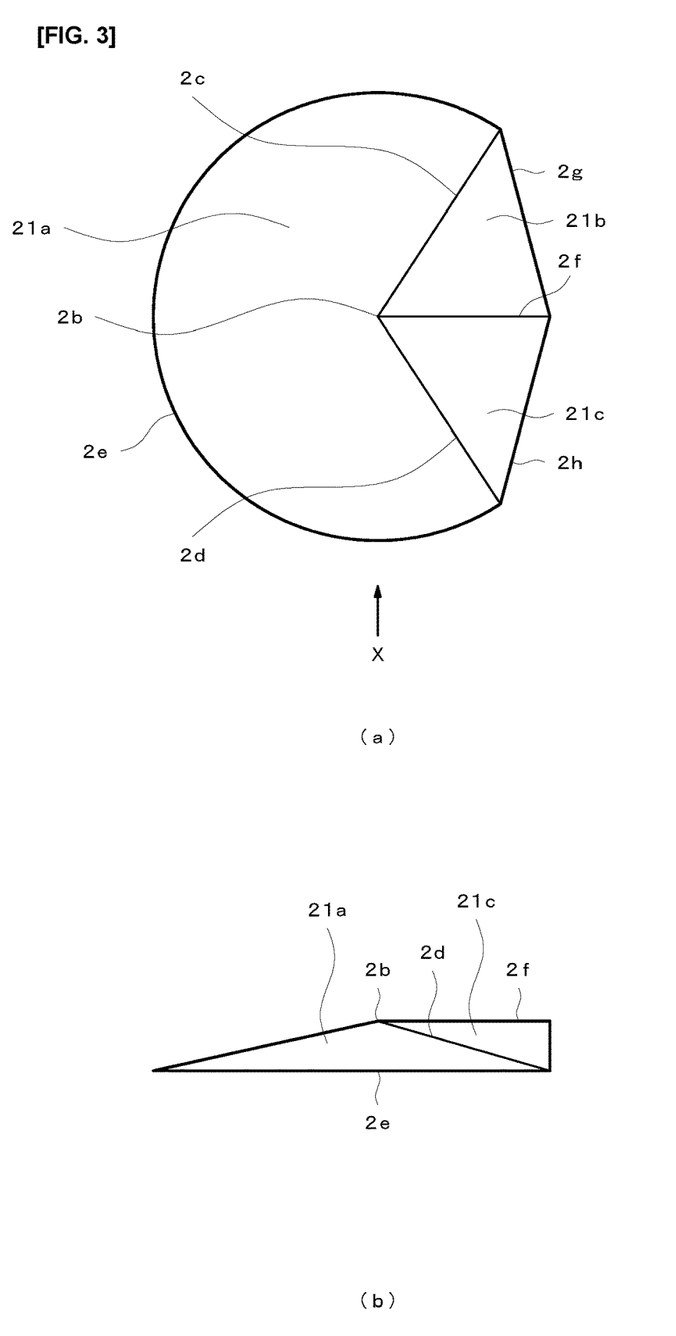
FIG. 3(a) is a schematic plan view of the dispersion table.
FIG. 3(b) is a side view of the dispersion table viewed from the direction of the arrow X in FIG. 3(a).

Referring to FIGS. 2 and 3, the schematic configuration of the dispersion table 2 will be described.

As shown in FIGS. 2 and 3(b), the dispersion table 2 is substantially in the shape of a cone.

The dispersion table 2 has a table main body 21 and a wall portion 22. The table main body 21 has a first face 21a, a second face 21b, and a third face 21c.

The first face 21a is a region substantially in the shape of a sector defined by a first boundary 2c and a second boundary 2d extending downward from a center point 2b (vertex) toward the circumferential edge of the dispersion table 2, and an arc 2e about the center point 2b (see FIG. 3(a)).

The second face 21b is a region substantially in the shape of a triangle defined by the first boundary 2c, a ridge 2f horizontally extending from the center point 2b to the wall portion 22, and a third boundary 2g functioning as a boundary between the table main body 21 and the wall portion 22 (see FIG. 3(a)).

The third face 21c is a region substantially in the shape of a triangle defined by the second boundary 2d, the ridge 2f, and a fourth boundary 2h functioning as a boundary between the table main body 21 and the wall portion 22 (see FIG. 3(a)).

In the circumferential edge of the table main body 21, the side not provided with the wall portion 22 is a discharge region from which articles are discharged, and the side provided with the wall portion 22 is a non-discharge region from which articles are not discharged.

The first face 21a is inclined downward from the center point 2b toward the guide portions 2a of the dispersion table 2. The second face 21b is inclined downward from the ridge 2f toward the first boundary 2c. The third face 21c is inclined downward from the ridge 2f toward the second boundary 2d.

With the above-described configuration, the second face 21b has an angle of inclination larger than that of the first face 21a. Also, the third face 21c has an angle of inclination larger than that of the first face 21a.

Figure 4:
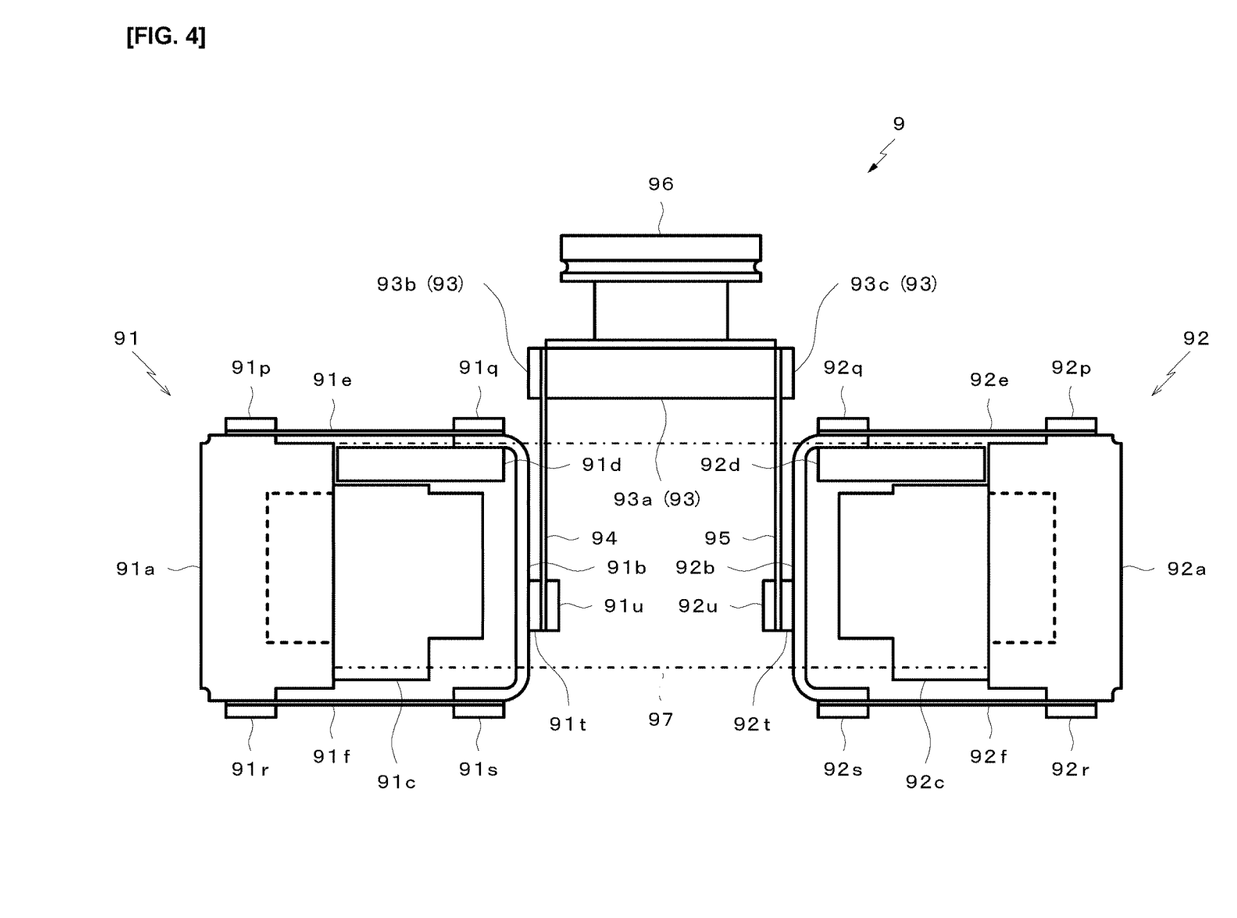
FIG. 4 is a schematic side view showing the configuration of a vibration unit.
Figure 5:
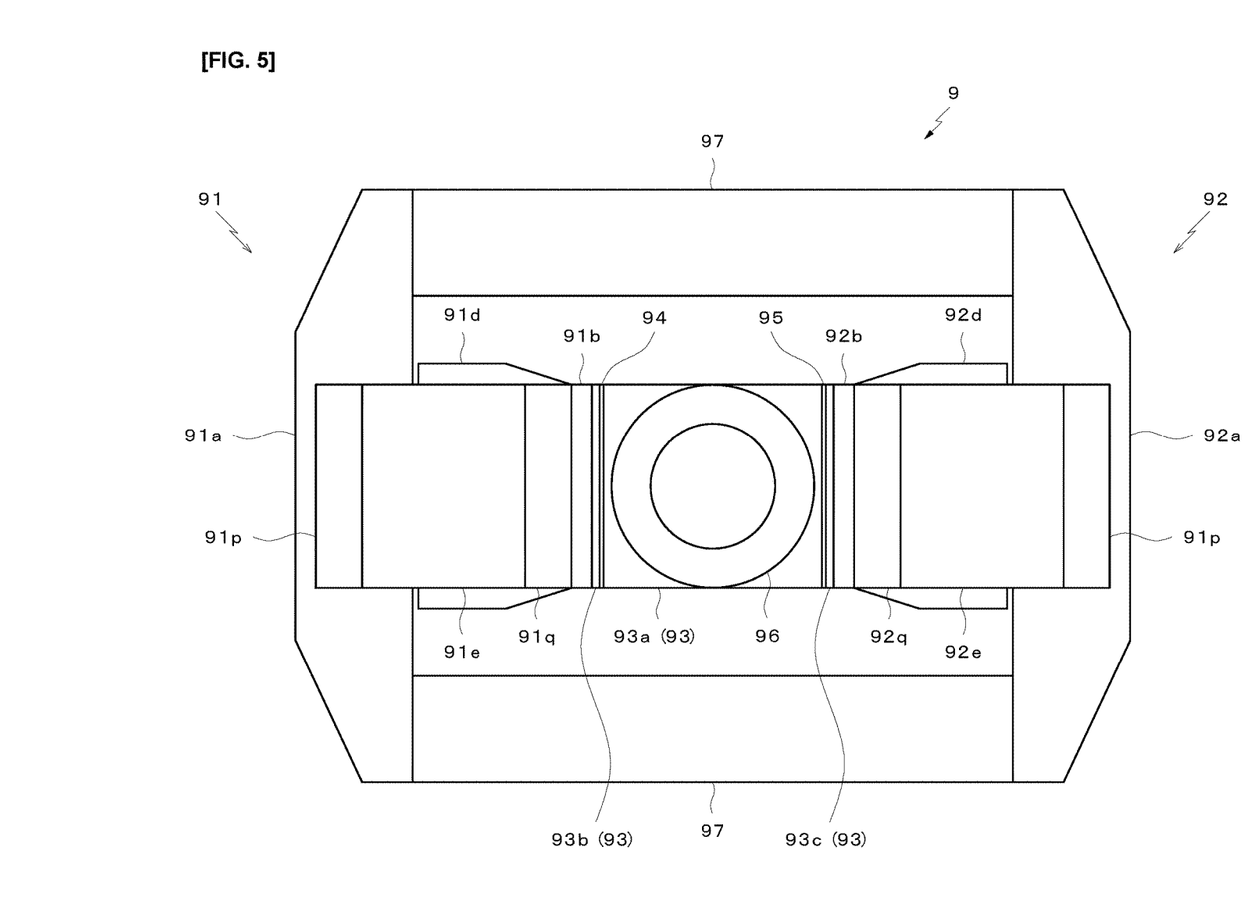
FIG. 5 is a schematic plan view showing the configuration of the vibration unit.

Referring to FIGS. 4 and 5, the schematic configuration of the vibration unit 9 will be described.

As shown in FIGS. 4 and 5, the vibration unit 9 includes a pair of vibration portions 91 and 92, a movable portion 93, a pair of plate springs 94 and 95, an attachment bracket 96, and a pair of weights 97.

The vibration portion 91 has a fixed frame 91a, a movable frame 91b, an electromagnet 91c, an armature 91d, two plate springs 91e and 91f, and six plate spring retainers 91p to 91u.

The fixed frame 91a is a block member substantially in the shape of a trapezoid. The movable frame 91b is a block member substantially in the shape of a U.

The electromagnet 91c is attached to the inner wall of the fixed frame 91a. The armature 91d is attached to the upper inner wall of the movable frame 91b.

Each of the two plate springs 91e and 91f is arranged spanning between the fixed frame 91a and the movable frame 91b. Specifically, one end of the plate spring 91e is fixed to the fixed frame 91a in a state of being held between the upper face of the fixed frame 91a and the plate spring retainer 91p. The other end of the plate spring 91e is fixed to the movable frame 91b in a state of being held between the upper face of the movable frame 91b and the plate spring retainer 91q.

One end of the plate spring 91f is fixed to the fixed frame 91a in a state of being held between the lower face of the fixed frame 91a and the plate spring retainer 91r. The other end of the plate spring 91f is fixed to the movable frame 91b in a state of being held between the lower face of the movable frame 91b and the plate spring retainer 91s.

The vibration portion 92 has a fixed frame 92a, a movable frame 92b, an electromagnet 92c, an armature 92d, two plate springs 92e and 92f, and six plate spring retainers 92p to 92u.

The fixed frame 92a is a block member substantially in the shape of a trapezoid. The movable frame 92b is a block member substantially in the shape of a U.

The electromagnet 92c is attached to the inner wall of the fixed frame 92a. The armature 92d is attached to the upper inner wall of the movable frame 92b.

Each of the two plate springs 92e and 92f is arranged spanning between the fixed frame 92a and the movable frame 92b. Specifically, one end of the plate spring 92e is fixed to the fixed frame 92a in a state of being held between the upper face of the fixed frame 92a and the plate spring retainer 92p. The other end of the plate spring 92e is fixed to the movable frame 92b in a state of being held between the upper face of the movable frame 92b and the plate spring retainer 92q.

One end of the plate spring 92f is fixed to the fixed frame 92a in a state of being held between the lower face of the fixed frame 92a and the plate spring retainer 92r. The other end of the plate spring 92f is fixed to the movable frame 92b in a state of being held between the lower face of the movable frame 92b and the plate spring retainer 92s.

The movable portion 93 has an attachment frame 93a and two plate spring retainers 93b and 93c.

The plate spring 94 is arranged spanning between the movable frame 91b and the movable portion 93. Specifically, the lower end of the plate spring 94 is fixed to the movable frame 91b in a state of being held between the plate spring retainer 91t fixed to the outer wall face of the movable frame 91b and the plate spring retainer 91u facing the plate spring retainer 91t. The upper end of the plate spring 94 is fixed to the attachment frame 93a in a state of being held between the outer wall face of the attachment frame 93a of the movable portion 93 and the plate spring retainer 93b.

The plate spring 95 is arranged spanning between the movable frame 92b and the movable portion 93. Specifically, the lower end of the plate spring 95 is fixed to the movable frame 92b in a state of being held between the plate spring retainer 92t fixed to the outer wall face of the movable frame 92b and the plate spring retainer 92u facing the plate spring retainer 92t. The upper end of the plate spring 95 is fixed to the attachment frame 93a in a state of being held between the outer wall face of the attachment frame 93a of the movable portion 93 and the plate spring retainer 93c.

The attachment bracket 96 is arranged on the upper face of the attachment frame 93a of the movable portion 93.

The dispersion table 2 is attached to the attachment bracket 96.

The weights 97 are arranged spanning between the fixed frame 91a of the vibration portion 91 and the fixed frame 92a of the vibration portion 92.

Referring to FIG. 4, an operation of the vibration unit 9 will be described.

When the electromagnet 91c of the vibration portion 91 is driven, the armature 91d is attracted to the electromagnet 91c, and thus the movable frame 91b is moved downward, and the two plate springs 91e and 91f are deflected downward. When the two plate springs 91e and 91f are deflected downward, the movable frame 91b is moved downward parallel to the fixed frame 91a.

In a similar manner, when the electromagnet 92c of the vibration portion 92 is driven, the armature 92d is attracted to the electromagnet 92c, and thus the movable frame 92b is moved downward, and the two plate springs 92e and 92f are deflected downward. When the two plate springs 92e and 92f are deflected downward, the movable frame 92b is moved downward parallel to the fixed frame 92a.

The pair of vibration portions 91 and 92 vibrate in the same direction in synchronization with each other under the control of the controller (not shown). Accordingly, when the electromagnets 91c and 92c are driven, the movable frames 91b and 92b move away from each other while moving downward as described above (perform a so-called arc motion).

Accordingly, the pair of plate springs 94 and 95 attached to the movable frames 91b and 92b are moved downward. As a result, the attachment bracket 96 is also moved downward. At this time, an increase in the distance between the movable frames 91b and 92b is absorbed by the pair of plate springs 94 and 95 being deflected outward, and thus the attachment bracket 96 moves only downward. When the driving of the electromagnets 91c and 92c is repeatedly turned on/off, the attachment bracket 96 vibrates up and down together with the dispersion table 2.

With the thus configured dispersion table 2 and vibration unit 9, articles loaded from above onto the center of the dispersion table 2 slide down the first face 21a and move toward the plurality of supply hoppers 4. At this time, since the dispersion table 2 is vibrated up and down by the vibration unit 9, the articles on the dispersion table 2 are radially dispersed.

Furthermore, since each of the second face 21b and the third face 21c has an angle of inclination larger than that of the first face 21a, articles positioned near the wall portion 22 slide down the second face 21b and the third face 21c and move to the first face 21a.

As described above, according to this embodiment, the dispersion table 2 is vibrated up and down by the vibration unit 9 having the pair of vibration portions 91 and 92, and thus the load that acts on the vibration unit 9 can be suppressed even when the size of the dispersion table 2 is increased, and malfunctioning of or damage to the vibration unit 9 can be prevented.

Furthermore, in this embodiment, when the movable frames 91b and 92b move away from each other while moving downward (perform a so-called arc motion), an increase in the distance between the movable frames 91b and 92b is suppressed by the pair of plate springs 94 and 95 being deflected outward, and thus only vibrations in the up-down direction are imparted to the attachment bracket 96. As a result, only vibrations in the up-down direction are imparted to the dispersion table 2 as well, and thus unevenness in the dispersion of articles caused by unevenness in the vibrations can be suppressed compared with a case of a vibration unit including only one vibration portion for generating vibrations up and down.

Furthermore, in this embodiment, in the table main body 21 of the dispersion table 2, the second face 21b and the third face 21c each having an angle of inclination larger than that of the first face 21a are located on the wall portion 22 side, and thus the accumulation of articles on the wall portion 22 side can be suppressed.

Above, an embodiment of the present invention has been described, but the invention is not limited thereto, and various modifications can be made within the scope not departing from the gist of the invention.

In the foregoing embodiment, the ridge 2f of the dispersion table 2 extends in the horizontal direction, but there is no limitation to this. That is to say, there is no particular limitation on the angle of the ridge 2f as long as the second face 21b and the third face 21c extending from the ridge 2f are inclined downward so that the portion in contact with the wall portion 22 is inclined downward. Accordingly, the ridge 2f may be inclined upward or downward.

Furthermore, the ridge 2f does not have to be clear, and, for example, it may be a line extending along the top of a curved face.

The first face 21a, the second face 21b, and the third face 21c may not be flat faces, and they may be curved faces as long as they are inclined downward. Furthermore, the first face 21a, the second face 21b, and the third face 21c may be each configured by a combination of a plurality of flat faces and curved faces instead of one face.

Furthermore, in the foregoing embodiment, the third boundary 2g and the fourth boundary 2h are straight lines, but there is no limitation to this, and they may be curved lines. Accordingly, the wall portion 22 also may be a curved face.

Furthermore, in the foregoing embodiment, two combination balances 100 may be arranged adjacent to each other such that the wall portions 22 (non-discharge regions) provided at the dispersion tables 2 face each other, thereby forming one combination balance device having two combination balances 100.

Furthermore, the combination balance according to the present invention can be applied to articles other than food.

REFERENCE SIGNS LIST

2 Dispersion table
21a First face
21b Second face
21c Third face
22 Wall portion
9 Vibration unit
91, 92 Vibration portion
91a, 92a Fixed frame
91b, 92b Movable frame
91c, 92c Electromagnet
91d, 92d Armature
91e, 92e Plate spring
91f, 92f Plate spring
93 Movable portion
94, 95 Plate spring
96 Attachment bracket
100 Combination balance

The invention claimed is:

1. A combination balance comprising:
a dispersion table configured to radially disperse articles loaded from above; and
a vibration unit configured to vibrate the dispersion table up and down,
wherein the vibration unit comprises:
the plurality of vibration portions;
an attachment bracket for attachment of the dispersion table;
a movable portion configured to impart vibrations of the plurality of vibration portions to the attachment bracket; and
a weight arranged spanning between the plurality of the vibration portions,
wherein at least one of the vibration portions comprises:
an electromagnet and an armature configured to contact to and separate from each other vertically; and
a first plate spring extending vertically and connected to the movable portion so that the first plate is configured to move vertically by the electromagnet and the armature.

2. The combination balance according to claim 1,
wherein the vibration portion comprises:
a fixed frame connected to the electromagnet;
a movable frame connected to the armature;
a pair of second plate spring extending horizontally;
wherein one second plate is connected to the upper end of the fixed frame and the upper end of the movable frame, and the other second plate is connected to the lower end of the fixed frame and the lower end of the movable frame, and
the movable frame is connected to the first plate spring.

3. The combination balance according to claim 1,
wherein a pair of the vibration portions are provided,
the pair of the vibration portions are disposed under the movable portion, and
the pair of the vibration portions face each other across the movable portion.

4. The combination balance according to claim 2,
wherein a pair of the vibration portions are provided,
the pair of the vibration portions are disposed under the movable portion, and
the pair of the vibration portions face each other across the movable portion.

5. The combination balance according to claim 3,
wherein a pair of the weights are provided,
the pair of the weights face each other across the movable portion, and
the pair of the weights are connected to the pair of the vibration portions.

6. The combination balance according to claim 4,
wherein a pair of the weights are provided,
the pair of the weights face each other across the movable portion, and
the pair of the weights are connected to the pair of the vibration portions.

* * * * *